US005851421A

United States Patent [19]

Choy et al.

[11] Patent Number: 5,851,421

[45] Date of Patent: *Dec. 22, 1998

[54] THICKENED HYPOCHORITE SOLUTIONS WITH REDUCED BLEACH ODOR AND METHOD AND MANUFACTURE OF USE

[75] Inventors: Clement K. Choy, Alamo; Aram Garabedian, Jr., Fremont, both of Calif.

[73] Assignee: The Clorox Company, Oakland, Calif.

[ * ] Notice: The term of this patent shall not extend beyond the expiration date of Pat. No. 5,688,756.

[21] Appl. No.: 959,740

[22] Filed: Oct. 26, 1997

Related U.S. Application Data

[63] Continuation of Ser. No. 618,006, Mar. 18, 1996, abandoned, which is a continuation of Ser. No. 500,713, Jul. 11, 1995, abandoned, which is a continuation of Ser. No. 3,037, Jan. 11, 1993, abandoned.

[51] Int. Cl.$^{6}$ .............................. C01B 11/06; D06L 3/06

[52] U.S. Cl. .............................. 252/187.26; 252/187.25; 252/187.24; 252/186.36

[58] Field of Search .............................. 252/186.24, 186.25, 252/186.26, 186.36

[56] References Cited

U.S. PATENT DOCUMENTS

| | | | |
|---|---|---|---|
| 3,976,551 | 8/1976 | Laufer et al. | 252/98 |
| 4,116,849 | 9/1978 | Leikhim | 252/103 |
| 4,116,851 | 9/1978 | Rupe et al. | 252/103 |
| 4,576,728 | 3/1986 | Stoddart | 252/102 |
| 4,646,973 | 3/1987 | Focaracci | 239/428.5 |
| 4,800,036 | 1/1989 | Rose | 252/102 |
| 4,836,948 | 6/1989 | Corring | 252/99 |
| 4,839,077 | 6/1989 | Cramer et al. | 252/98 |
| 4,839,079 | 6/1989 | Wainberg et al. | 252/104 |
| 4,842,771 | 6/1989 | Rorig et al. | 252/547 |
| 4,941,988 | 7/1990 | Wise | 252/99 |
| 4,943,392 | 7/1990 | Hastedt et al. | 252/539 |
| 4,952,333 | 8/1990 | Cramer | 252/187.24 |
| 4,954,280 | 9/1990 | Elliott et al. | 252/90 |
| 5,024,776 | 6/1991 | Kreischer | 252/97 |
| 5,053,158 | 10/1991 | Dixit et al. | 252/99 |
| 5,057,237 | 10/1991 | Drapier et al. | 252/97 |
| 5,130,043 | 7/1992 | Prince et al. | 252/95 |
| 5,348,682 | 9/1994 | Finley et al. | 252/186.36 |
| 5,384,061 | 1/1995 | Wise | 510/223 |
| 5,529,711 | 6/1996 | Brodbeck et al. | 510/369 |
| 5,688,756 | 11/1997 | Garabedier, Jr. et al. | 510/369 |

FOREIGN PATENT DOCUMENTS

| | | | |
|---|---|---|---|
| 295 093 | 12/1988 | European Pat. Off. | C11D 3/395 |
| 329 419 | 2/1989 | European Pat. Off. | C11D 17/00 |
| 345 611 | 12/1989 | European Pat. Off. | C11D 17/00 |
| 373 864 | 6/1990 | European Pat. Off. | C11D 3/395 |
| 421 738 | 10/1990 | European Pat. Off. | C11D 3/395 |
| 399 752 | 11/1990 | European Pat. Off. | C11D 1/06 |
| 479 370 | 9/1991 | European Pat. Off. | C11D 17/00 |
| 62-158799 | 7/1987 | Japan | C11D 10/02 |
| 62-286000 | 12/1987 | Japan | C11D 10/02 |
| 63-72798 | 4/1988 | Japan | C11D 10/02 |
| 2 046 321 | 11/1980 | United Kingdom | D06L 3/06 |
| 2 176 495 | 12/1986 | United Kingdom | C11D 17/00 |
| 2 185 037 | 7/1987 | United Kingdom | C11D 3/20 |

OTHER PUBLICATIONS

Perry & Chilton, *Chemical Engineers Handbook*, 5th Ed., vol. 18 (McGraw Hill 1973), pp. 82–83.

*Primary Examiner*—Joseph D. Anthony
*Attorney, Agent, or Firm*—Sharon R. Kantor

[57] ABSTRACT

A thickened liquid bleach composition and methods of use and manufacture are disclosed wherein the hypochlorite bleach composition includes about 0.1–10% by weight hypochlorite and is thickened by a thickening component including a cross-linked polyacrylate polymer in an amount effective for thickening the composition, effectively reducing bleach odor when the composition is dispensed onto a surface to be cleaned and also maintaining stability of the composition, the cross-linked polyacrylate polymer preferably forming about 0.2–2.0% by weight and more preferably about 0.4–0.8% by weight of the composition, the composition also including a stabilizer for the cross-linked polyacrylate polymer. The composition is adapted for being directed onto hard surfaces to be cleaned. The composition preferably exhibits shear sensitivity or plasticity facilitating its use in the spray-type dispenser.

23 Claims, No Drawings

THICKENED HYPOCHORITE SOLUTIONS WITH REDUCED BLEACH ODOR AND METHOD AND MANUFACTURE OF USE

This is a continuation of application Ser. No. 08/618,006, filed 18 Mar. 1996 now abandoned; which is a continuation of Ser. No. 08/500,713, filed Jul. 11, 1995, now abandoned; which is a continuation of Ser. No. 08/003,037, filed Jan. 11, 1993, now abandoned.

FIELD OF THE INVENTION

The present invention relates to hypochlorite bleach compositions and methods of use and manufacture and more particularly to thickened hypochlorite bleach solutions for use as hard surface cleaners and methods of use and manufacture.

BACKGROUND OF THE INVENTION

Thickened hypochlorite bleach solutions or compositions have long been used in a variety of applications including hard surface cleaning, disinfecting and the like. These compositions are typically provided with increased viscosity for a number of reasons, principally to increase residence time of the composition on non-horizontal surfaces.

More specifically, such compositions have been widely contemplated for use in hard surface cleaning. Because of the hypochlorite bleach component in these compositions, they tended to exhibit a noticeable bleach odor which was found to be objectionable in varying degrees by users. Accordingly, efforts were made to produce such cleaning compositions while reducing the bleach odor. One prior art approach in this regard was the use of thickened bleach compositions in foam-type dispensers as disclosed for example in Japanese patent application 62-286000 by Miyamori, et al., dated Dec. 11, 1987 and Japanese patent application 63-72798 by Nibin, et al. dated Apr. 2, 1988. These references disclosed the use of foaming systems for achieving reduced bleach odor or irritation. However, the effective surface area covered by the foam-type dispensers were dependent upon the amount of foamed material produced or generated by the dispenser. Accordingly, only a relatively small surface area could be covered during each operating sequence of the dispenser so that substantial time and effort was required for a given cleaning task. In other words, these dispensers were characterized by the need for applying the foamed material directly from the dispenser onto the surface to be cleaned. Accordingly, the foam-type dispensers were relatively inefficient in their ability to rapidly apply the foamed material to large areas of surfaces to be cleaned.

Many different examples of thickened hypochlorite bleach compositions have been available from a wide variety of sources for use in hard surface cleaning. For example, European Patent Application EP 373864 by Iding, et al., assigned to The Procter & Gamble Company and U.S. Pat. No. 5,130,043 issued Jul. 14, 1992 to Prince, et al. and also assigned to The Procter & Gamble Company, disclosed hypochlorite bleach compositions consisting of polyacrylate thickeners, amine oxide detergent, and optional fatty acid soap and/or a bleach stable synthetic anionic detergent for cleaning hard surfaces such as toilet bowls, bathroom tiles and shower walls.

Other prior art references have also described various thickened automatic dish washing liquid compositions using polyacrylates in combination with colloidal thickeners to provide proper rheology and stability in hypochlorite bleach compositions including various adjuncts. U.S. Pat. No. 4,576,728 issued to Stoddart is representative of these other prior art references.

Generally, these compositions have performed satisfactorily for their intended purpose. However, there has been found to remain a need for thickened hypochlorite bleach compositions offering improved characteristics and benefits for use in such applications.

SUMMARY OF THE INVENTION

The present invention is based upon the realization that most if not all of the hypochlorite bleach compositions referred to above are characterized by a noticeable "bleach odor" even where the composition also includes one or more fragrances or the like intended to mask or make the bleach odor less objectionable. The bleach odor may result, for example, from the hypochlorite itself, from molecular chlorine or from related compounds such as hypochlorous acid or combinations of the above. The specific components resulting in the bleach odor may depend upon different conditions such as the resulting pH particularly when the hypochlorite bleach composition is applied to a surface to be cleaned. At the same time, it is of course also desirable to maintain conditions in such compositions including thickening and stability.

Accordingly, it is a particular object of the invention to provide a thickened hypochlorite bleach composition having combined benefits of thickening, bleach odor reduction and stability. Cross-linked polyacrylate polymers, available for example under the trade name CARBOPOL from B. F. Goodrich Company and under the trade name POLYGEL from 3V Chemical Company, have surprisingly and unexpectedly been found in the present invention to produce desired benefits of thickening or viscosity increase and stabilization in such hypochlorite compositions while simultaneously serving to reduce bleach odor. The cross-linked polyacrylate polymers generally form from about 0.2 to about 2.0 weight percent of the hypochlorite composition and more preferably from about 0.4 to about 0.8 percent weight of the hypochlorite composition for achieving the combined characteristics of thickening, stabilization and bleach odor reduction.

The present invention further contemplates use of the hypochlorite solution in a dispenser suitable for directing the composition in a stream or spray onto hard surfaces to be cleaned. In such applications, thickening of the hypochlorite composition is desired in order to increase "dwell time" of the composition on the surfaces, particularly where the surfaces are not horizontal. The characteristic of stability is of course important during storage of the composition in the dispenser and during use of the product. The characteristic of reduced bleach odor is important in order to avoid the undesirable and possibly harsh odor of the bleach components in the composition particularly when the composition is directed onto the surfaces to be cleaned. In this regard, the particular components responsible for the bleach odor may vary depending upon application conditions, particularly upon components to be cleaned from the surface as well as other conditions such as temperature, etc. Components responsible for the so-called "bleach odor" include the hypochlorite itself as well as other components of the hypochlorite composition including hypochlorous acid or chlorine which is commonly present particularly when the pH of the composition is substantially reduced to an acid range, for example, by contact with organic materials to be cleaned from the hard surfaces. The cross-linked polyacrylate polymers have been found to be unexpectedly effective for reducing such bleach odors regardless of the components responsible for the bleach odor as discussed above.

The invention more particularly contemplates use of the hypochlorite composition of the present invention in spray dispensers, particularly manually operated dispensers such as trigger type dispensers. Use of the hypochlorite composition in such dispensers is particularly desirable in order to direct a uniform layer or film of the composition onto a surface to be cleaned. The cross-linked polyacrylate polymers of the present invention have further been found to surprisingly and unexpectedly display additional characteristics further enhancing the hypochlorite compositions for such applications. More specifically, in addition to contributing improved thickening and stability as well as unexpected bleach odor reduction within the hypochlorite composition because of their cross-linked character, the polyacrylate polymers further exhibit shear sensitivity or, in other words, substantial viscosity reduction upon exposure to shear as experienced within the preferred spray type dispensers. In addition to shear sensitivity which is particularly important for producing a uniform spray across the surface, the polyacrylate polymers further provide rapid viscosity recovery in the composition. This additional characteristic of rapid viscosity recovery is also particularly important because it allows the hypochlorite composition to rapidly or immediately regain its viscosity as it approaches or is deposited onto the surface to be cleaned.

It is further theorized that the odor reducing capabilities of the cross-linked polyacrylate polymers are due, at least in part, to their characteristic yield value. More specifically, it is theorized that the yield value of the cross-linked polyacrylate polymers, possibly in combination with the rapid viscosity recovery of polyacrylate polymers generally, contributes to their ability to prevent or limit release of oxidants from the composition tending to cause the bleach odor as discussed above. However, this theory is set forth only for the purpose of possibly explaining the present invention and is not intended to limit the scope of the invention.

Accordingly, the present invention preferably contemplates the use of cross-linked polyacrylate polymers characterized by a yield value for the composition generally in the range of from about 0.1 to 100 dynes/$cm^2$, more preferably from about 0.4 to about 50 dynes per $cm^2$ and most preferably from about 0.4 to about 25.

The preferred cross-liked polyacrylate polymers of the present invention have also been found to exhibit reduced "bounce-back" which further enhances utility of the hypochlorite compositions of the present invention as hard surface cleaners, particularly when applied by a spray-type dispenser. Bounce-back is observed when a liquid composition is sprayed onto a hard surface. A portion of the composition tends to adhere to the surface upon contact with a remaining portion of the composition tending to rebound or experience bounce-back so that it is not effective to assist in cleaning of the hard surface. The characteristic of bounce-back may be attributed partially to desirable characteristics such as rapid viscosity recovery of a shear sensitive material as appears to be common in all polyacrylate polymers, regardless of whether or not they are cross-linked. The viscosity of such compositions is of course substantially reduced by shear developed in the spray orifice or orifices of the dispenser. The rapid viscosity recovery enables the composition to again achieve its relatively high viscosity, enhancing the ability of the composition to adhere to the hard surface. However, the reduction of bounce-back observed in connection with the cross-linked polyacrylate polymers of the present invention is attributed in large part to the yield value characteristic of the cross-linked polyacrylate polymers as set forth above.

More broadly, the characteristic yield value for such cross-linked polyacrylate polymers is also believed to be the principal contributing factor in the reduced bleach odor and possible in the enhanced thickening and stability observed for hypochlorite compositions included such cross-linked polyacrylate polymers according to the present invention.

Desirable characteristics of the cross-linked polyacrylate polymers within the compositions of the present invention as summarized above are believed to be particularly exemplified by atomization data described below and generally relating to the dwell time of the composition as fine particles suspended in air adjacent to a surface to be cleaned. As noted above, the atomization data is particularly related to particle size of the composition as a spray suspended in air and to the characteristic of "bounce-back" as also summarized above.

Combinations or mixtures of different cross-linked polyacrylate polymers are also preferably contemplated by the present invention as being desirable for providing their combined properties or characteristics in such compositions.

The amounts of the cross-linked polyacrylate polymer and other components of the composition are selected in order to achieve a thickness for the composition in the broad range of from about 20 centipoise up to a maximum thickness less than a gel condition. Preferably, the composition of the invention has a maximum thickness of up to about 5,000 cps, more preferably a maximum thickness of about 1,000 cps and most preferably a viscosity range of about 50–300 cps in order to achieve optimum atomization as summarized above and described in greater detail below.

In addition to reducing bleach odor and increasing viscosity, the cross-linked polyacrylate polymers each provide at least good long term stability for the compositions of the invention, at least under generally normal storage conditions.

Interaction of the cross-linked polyacrylate polymers with the hypochlorite component of the composition is particularly important for maintaining all of the desirable characteristics of thickening, stability and particularly bleach odor reduction. In this regard, certain salts of the hypochlorite components, most notably sodium chloride, have been found to interfere with phase stability of the polymer and its ability to achieve thickening within the composition. Accordingly, the invention more preferably contemplates selection of the hypochlorite components in the composition for enhancing both the phase stability and thickening characteristics of the cross-linked polyacrylate polymers.

In order to avoid the presence of salts such as sodium chloride within the compositions, the hypochlorite component is preferably selected or formed in a manner avoiding the presence of undesirable salts. For example, hypochlorite bleaches are commonly formed by bubbling chlorine gas through liquid sodium hydroxide or corresponding metal hydroxide to result in formation of the corresponding hypochlorite. However, such reactions are undesirable for the present invention since they commonly result in formation of a salt such as sodium chloride.

The present invention thus preferably contemplates hypochlorites formed for example by reaction of hypochlorous acid with sodium hydroxide or other metal hydroxides in order to produce the corresponding hypochlorite with water as the only substantial by-product. Sodium hypochlorite bleach produced in this manner is available from a number of sources, for example Olin Corporation which produces sodium hypochlorite bleach as a 35% solution in water. The slurry is of course diluted to produce the hypochlorite composition of the present invention.

As noted above, the hypochlorite may be formed with other alkaline metals as are well known to those skilled in the art. Although the term "hypochlorite" is employed herein, it is not intended to limit the invention only to the use of chloride compounds but is also intended to include other halides or halites, as discussed in greater detail below. Generally, the present invention contemplates the hypochlorite as being most preferably potassium hypochlorite and secondarily sodium hypochlorite. Less favored is a hypochlorite of any alkali metal including a chloride salt of the corresponding alkali metal. Here again, hypohalites formed with similar alkaline metals are contemplated in the same order of preference for the invention. Furthermore, it is specifically contemplated that the hypochlorite component of the invention either avoids the inclusion of a chloride salt as noted above or includes such a chloride salt only within a range of up to about 1% by weight of the composition. As the hypochlorite component is increased from about 1% by weight of the composition, the chloride salt should be even further reduced since the chloride salt, particularly in the presence of the hypochlorite component, makes it difficult to achieve desirable thickening of the composition.

The hypochlorite component and any salt present within the composition are also the principal source of ionic strength for the composition. The ionic strength of the composition has an effect on thickening, that is, if the percentage of salt as noted above is exceeded, it becomes difficult to achieve desirable thickening in the composition. Moreover, ionic strength has some effect on stability of the composition; however, the effect of ionic strength on stability is minimal relative to the effects of the cross-linked polyacrylate polymers and the polymer stabilizer in the composition. In summary, the ionic strength of the compositions of the present invention is maintained preferably less than about 2.5 g-ions/Kg, more preferably less than about 1.5 g-ions/Kg, and most preferably less than about 0.75 g-ions/Kg, and may be adjusted by varying the amount of hypochlorite and salt in the composition.

A stabilizer may also preferably be included in the composition to assure stability for the combination of the hypochlorite bleach and the cross-linked polyacrylate polymers. The stabilizer is present in a minimum amount for the dual purposes of (1) neutralizing the polymer to enhance its thickening effect, and (2) buffering the hypochlorite. For both of these purposes, the stabilizer is present in the composition in an amount for maintaining the pH of the composition at a minimum level of about 11 and preferably in a range of about 12–13.5. The stabilizer is preferably present in the composition on a mole equivalent basis with reference to the cross-linked polyacrylate polymer for neutralizing the polymer as summarized above.

Both the hypochlorite bleach and the stabilizer are preferably selected in order to achieve optimum ionic strength for the composition. In accordance with the preceding discussion, potassium hydroxide is a preferred stabilizer with sodium hydroxide being a secondary interest in the invention. Here again, the selection of potassium as the alkali metal in both the hypochlorite component and the stabilizer serves to increase both solubility of the bleach in the composition and to stabilize the cross-linked polymer. In other words, potassium is a preferred alkali metal in both the hypochlorite bleach component and the stabilizer serves to enhance the desirable characteristic of stability while also providing optimum ionic strength in the composition. It is believed that there is less tendency for the cross-linked polyacrylate polymer to be precipitated from the composition, or in other words, to exhibit phase sensitivity in the presence of potassium as an alkali metal. Accordingly, the thickening effect of the cross-linked polyacrylate polymers is also enhanced by the selection of both the hypochlorite component and the stabilizer.

The present invention also contemplates the hypochlorite composition as preferably also including a fragrance component in order to mask or offset the bleach odors referred to above. In this regard, it is further theorized that the preferred cross-linked polyacrylate polymers of the present invention may be selective in limiting bleach odor while at the same time enhancing the effect of a fragrance component in the composition. It is further theorized that this preferential effect of the cross-linked polyacrylate polymers may be due to the relative volatility of the oxidants responsible for the bleach odor and the fragrance components which are typically more volatile in nature. Here again, such a theory is set forth only for purposes of possibly explaining the invention and not to limit the scope of the invention.

The hypochlorite composition preferably includes a bleach stable fragrance component and more preferably a bleach stable fragrance component which is relatively more volatile than the oxidants included in the hypochlorite component of the composition and responsible for the bleach odors noted above.

The invention even more preferably contemplates the inclusion of additional bleach stable surfactants either for enhancing thickening achieved by the cross-linked polyacrylate polymers or for other purposes. The surfactants and/or co-thickeners may be selected from a wide variety of well known surfactants such as alkyl ether sulfates.

The hypochlorite composition of the present invention together with the preferred cross-linked polyacrylate polymers for achieving combined thickening, stability and bleach odor reduction may also include other components either for enhancing one or more of the effects discussed above or for other purposes. For example, additional adjuncts in the hypochlorite composition may include a source of alkalinity for adjusting pH of the composition, electrolytes, buffers, builders, colorants, fluorescent whitening agents (FWA), etc. However, it is again noted that such adjuncts are selected to the extent that they not substantially interfere with the preferred characteristics of the present invention as described above.

Additional objects and advantages of the present invention are made apparent in the following detailed description of the invention and specific examples further embodying the invention.

DETAILED DESCRIPTION OF THE PREFERRED EMBODIMENTS

The different embodiments of the present invention set forth below commonly relate to liquid hypochlorite bleach compositions including a number of components and adapted for a variety of specific applications as discussed above. The respective components of the composition of the invention are discussed below together with a discussion of desired characteristics resulting from those components. Thereafter, a number of examples or preferred embodiments of the invention are set forth in an Experimental Section.

As summarized above, the present invention essentially relates to a hypochlorite bleach composition comprising an aqueous solution of a hypochlorite of an alkali metal together with a cross-linked polyacrylate polymer and a stabilizer for stabilizing the polymer in the hypochlorite composition as essential components for simultaneously achieving enhanced characteristics of thickening and stability while also surprisingly and unexpectedly achieving substantial bleach odor reduction within the composition.

The basic composition of the invention as summarized above may further include a bleach stable surfactant or surfactants either for enhancing the thickening effects of the cross-linked polyacrylate polymer or for achieving other desirable purposes within the composition.

The hypochlorite bleach composition of the present invention also preferably comprises a fragrance component which is also bleach stable and is included within the composition for the purpose of enhancing or further masking the reduced bleach odor achieved by the cross-linked polyacrylate polymers of the invention. Additional components may be included in the composition and are discussed in greater detail below together with the preferred component summarized above.

The Hypochlorite Component

Within the composition of the present invention, the hypochlorite component is initially selected for use in combination with the cross-linked polyacrylate polymer for enhancing one or more of the desired characteristics of thickening, stabilization and bleach odor reduction. Generally, the hypochlorite component of the composition may be provided by a variety of sources. Hypochlorite compounds or compounds producing hypochlorite or hypohalite in aqueous solution are preferred. Representative hypohalite-producing compounds include sodium, potassium, lithium and calcium hypochlorite, chlorinated trisodium phosphate dodecahydrate, potassium and sodium dichloroisocyanurate and trichlorocyanuric acid. Other N-chloroimides, N-chloroamides, N-chloramines, and chlorohydantoins are also suitable. Other hypohalite and hypohalite producing compounds are well known for use in such bleaching compositions and are also contemplated by the present invention. Accordingly, the compounds summarized above are intended to be representative and not limiting as to the scope of the invention.

As noted above, the hypochlorite is present in the composition in an amount equal to about 0.1 to about 10% by weight of the composition. Preferably or at least in certain embodiments or applications of the invention, the hypochlorite may form about 1.0–6.0% by weight of the composition for increased stability.

The hypochlorite component is preferably present in the composition in the absence of salts such as chlorides interfering with stability of the composition or other desired characteristics of thickening or bleach odor reduction, as discussed elsewhere herein. For this reason, the present invention particularly contemplates avoiding the use of hypochlorite bleaches formed by methods commonly generating salts such as sodium chloride as discussed above.

More preferably, the hypochlorite components comprise potassium hypochlorite, secondarily sodium hypochlorite and generally any hypochlorite of an alkali metal absent salts such as chlorides which have been found to interfere with stability.

More specifically, the hypochlorite component and accompanying constituents such as salts are preferably selected with the composition of the present invention in order to enhance phase stability of the composition achieved primarily by the cross-linked polyacrylate polymers and the accompanying characteristics of thickening and bleach odor reduction.

The Cross-Linked Polyacrylate Polymer Component

The cross-linked polyacrylate polymers of the present invention are generally characterized as resins in the form of acrylic acid polymers. These resins are well known for use in a number of applications and it is commonly theorized that the carboxyl groups in the polymers are responsible for desirable characteristics resulting from the polymers.

Such cross-linked polyacrylate polymers are available from a number of sources including materials available under the trade name CARBOPOL from B. F. Goodrich Company and under the trade name POLYGEL available from 3V Chemical Company. It is particularly noted in connection with the present invention that such polyacrylate polymers are generally characterized as being of either a normal uncross-linked type or a cross-linked type as specifically contemplated for use within the present invention. Cross-linked polyacrylate polymers of a type contemplated by the present invention are also believed to be available from other sources and which are also contemplated for use within the present invention.

The cross-linked polyacrylate polymers are generally characterized as acrylic acid polymers which are non-linear and water-dispersible while being cross-linked with an additional monomer or monomers in order to exhibit a molecular weight in the range from several hundred thousand to about 4,000,000. Preferably, the polymers are cross-linked with a polyalkenyl polyether, the cross-linking agents tending to interconnect linear strands of the polymers to form the resulting cross-linked product.

Generally all cross-linked polyacrylate polymers are effective for achieving generally good stability and odor reduction in compositions of the type contemplated by the present invention. However, some differences particularly in terms of stability have been observed for different cross-linked polyacrylate polymers. Suitable cross-linked polyacrylate polymers for purposes of the present invention include the 600 series, 900 series, 1300 series and 1600 series resins available under the trade name CARBOPOL from B. F. Goodrich. More specific examples of polymers selected from these series are included in the examples set forth in the Experimental Section below. Similarly, effective cross-linked polyacrylate polymers for purposes of the present invention also include those available under the trade name POLYGEL and specified as DA, DB, and DK. As noted above, these cross-linked polyacrylate polymers are available from 3V Chemical Company.

As is also illustrated by the examples in the following Experimental Section, certain of the cross-linked polyacrylate polymers noted above may provide particular advantages or features within a thickened composition as contemplated by the present invention. Accordingly, it is also contemplated by the present invention to particularly employ mixtures or combinations of such polymers in order to produce compositions exhibiting combined characteristics of the respective polymers.

The cross-linked polyacrylate polymers of the present invention are believed to be tightly coiled in a presolvated condition with relatively limited thickening capabilities. Upon being dispersed in water, the polymer molecules are hydrated and uncoil or relax to varying degrees. Thickening with the polyacrylate polymers is particularly effective when they are uncoiled or relaxed as noted above. Uncoiling of the polyacrylate polymers may be achieved for example by neutralizing or stabilizing the polymer with inorganic bases such as sodium hydroxide, potassium hydroxide, ammonium hydroxide or low molecular weight amines and alkanolamines. Neutralization or stabilization of the polyacrylate polymers in this manner rapidly results in almost instantaneous thickening of an aqueous solution containing the polymers.

As noted above, the particular effectiveness of the cross-linked polyacrylate polymers in the present invention is believed to be due to a characteristic yield point or yield value. In this regard, a typical liquid tends to deform as long as it is subjected to a tensile or shear stress of the type created by dispensing the liquid from a spray-type dispenser or the like. For such a liquid under shear, the ratio of the rate of deformation or shear to shear stress is constant. Liquids exhibiting such characteristics are commonly termed Newtonian liquids.

However, some non-Newtonian liquids tend to exhibit shear thinning and are commonly referred to as being pseudo-plastic. Still other non-Newtonian liquids exhibit plastic characteristics while also initially behaving as solids until the shear stress exceeds a certain value, the so-called “yield stress” or “yield value”, after which the shear stress increases more rapidly than Newtonian liquids. Such liquids are commonly referred to as being plastic and include compositions with the preferred cross-linked polyacrylate polymers of the present invention as a component.

The preceding discussion is set forth because the yield value of the cross-linked polyacrylate polymers of the present invention is believed to be essential to their performance in the present invention. Initially, the yield value of the polymers is believed to be the principal reason for the ability of the preferred polymers to achieve reduced bleach odor in the hypochlorite compositions of the present invention. In addition, it is believed that the yield value of these polymers may also contribute to their enhanced thickening and stabilizing characteristics. Furthermore, where the composition is to be packaged in and dispensed from a spray-type dispenser, the yield value of the polymers is also believed to be the reason for the compositions with the polymer exhibiting reduced bounce-back as described elsewhere herein. As discussed in greater detail elsewhere, this characteristic of reduced bounce-back is believed to be particularly important in the enhanced effectiveness of the present invention.

It has further been found that high shear conditions are to be avoided during formation of the compositions of the present invention in order to maintain desirable stability. In other words, it has been found desirable to employ relatively gentle dispersion techniques or mixing with reduced shear in order to maintain good stability within the resulting compositions.

In this regard, it is difficult to define acceptable shear in blending or mixing the compositions. Generally, it is theorized that excessive shear tends to rupture the cross-linked polyacrylate polymers so that their ability to achieve stable thickening is at least minimized. In any event, this discussion of preferably employing relatively low shear for forming the compositions of the present invention is set forth only for the purpose of assuring a complete understanding of the invention while not intending to specifically limit the scope of the invention.

As discussed elsewhere, the hypochlorite compositions of the present invention are contemplated for use either in dispensers of a general type contemplated for directing the composition in the form of a spray or stream toward a hard surface to be cleaned. In all such applications, the preferred cross-linked polyacrylate polymers have been found to novelly and unexpectedly produce superior levels of two essential characteristics including thickening and stabilization while also unexpectedly providing substantial bleach odor reduction as a third essential characteristic of the invention. These characteristics are described in greater detail immediately below in order to assure a more complete understanding of the invention.

Initially, it is contemplated that the hypochlorite compositions of the present invention have a thickness in the broad range of from about 20 centipoise up to a maximum thickness less than a gel condition. For purposes of the present invention, such gels are assumed to have a thickness in the range of about 8,000–10,000 centipoise (cps). More preferably, the invention contemplates a maximum thickness of up to about 5,000 cps, particularly where the composition is to be used in dispensers of a type directing the composition as a stream toward surfaces to be cleaned.

As also noted above, the invention preferably contemplates the use of the hypochlorite compositions in combination with spray-type dispensers which are more preferably manually operated and generally characterized as trigger-type dispensers. For use in such spray-type dispensers, it is important to select components of the composition to avoid plugging in the spray-producing orifices of the dispenser. For this reason and also to permit the formation of a spray with appropriately small droplets, the hypochlorite composition is more preferably contemplated to have a viscosity of from about 20 centipoise up to a maximum of about 1,000 centipoise. A viscosity range of about 50–300 centipoise is further preferred in order to achieve optimum atomization or spray droplets when the composition is dispensed through a spray-producing dispenser such as a trigger-type dispenser noted above. The present invention also contemplates the composition having a characteristic of shear sensitivity or shear thinning wherein the composition responds to shear of a type produced in spray dispensers by exhibiting reduced viscosity.

The thickened hypochlorite composition of the present invention is preferably used in combination with spray dispensers of a type having one or more restrictive orifices through which the composition is forced for producing small particles tending to produce bleach odor. As noted elsewhere herein, a preferred dispenser is a manual trigger-type dispenser having a single orifice for producing a spray pattern capable of covering a substantial area of a hard surface. It will of course be apparent that numerous types of spray dispensers are contemplated in this regard.

A spray dispenser of the type contemplated by the present invention is generally characterized as having one or more restrictive orifices through which the composition is forced or extruded to produce small particles as described herein while more preferably avoiding misting. Because of the shear effects in the orifice or orifices and the reduction of the composition into small particles, the use of a spray dispenser as contemplated by the present invention has a tendency to produce noticeable bleach odors as described above. As also indicated above, a preferred dispenser may be a manual or trigger-type dispenser with a single orifice for producing a spray pattern capable of covering a substantial area of a hard surface. Such a dispenser is disclosed for example in U.S. Pat. No. 4,646,973 issued Mar. 3, 1987 to Focaracci and assigned to the assignee of the present invention.

The viscosity of the composition is also of particular importance in dispensers that have shear creating orifices and particularly in spray-type dispensers where the shear is relatively substantial. Reduced thickness is of course important in order to allow the composition to properly pass through the spray orifice of such dispensers. However, at the same time, relative thickening of the composition is desirable in order to maintain a minimum particle size in the spray suspension of the composition. For example, the particle size in the spray may effect the amount of bleach odor reduction produced by the cross-linked polyacrylate polymers of the invention.

In this regard, it is generally desirable to avoid the formation of overly fine liquid droplets in such a spray. Such undesirably fine liquid droplets are contemplated herein under the term "mist". By contrast, relatively larger liquid droplets, referred to for example as "spray" tends to enhance the bleach odor reduction of the present invention, possibly because of the reduced surface area for the liquid droplets in spray form.

Accordingly, a mist may be considered undesirable for purposes of the present invention where a spray is desirable for purposes noted above.

Properties of a mist are defined for example in Perry and Chilton, *Chemical Engineers Handbook,* 5th Edition, Vol. 18, McGraw-Hill (1973), which provides a definition of mist and tests for determining properties of such mists. According to this reference, a mist, as distinguished from a spray, is generally defined as a gas-suspended liquid particle having a diameter of less than about 10 millimicrons, while a spray is a gas suspended liquid particle having a diameter greater than about 10 millimicrons. This discussion of mist versus spray is set forth herein primarily to provide a better understanding of the present invention. However, it is contemplated that the desirable characteristics of a spray are achieved with the most preferred viscosity range of about 50–300 centipoise as noted above.

In addition to having a characteristic of shear thinning for producing a finely divided and uniform spray, it is further contemplated that the composition preferably exhibit a further characteristic of rapid viscosity recovery. This characteristic of rapid viscosity recovery is considered necessary or at least desirable for the composition to again achieve its optimum thickened characteristics so that it will properly adhere to the surfaces to be cleaned. This characteristic is also commonly referred to as "dwell time". These characteristics of rapid viscosity recovery are primarily due to the presence of the polyacrylate polymer in the composition and are discussed in greater detail below. These characteristics are also theorized as being important for achieving the desirable characteristic of bleach odor reduction as also discussed in greater detail below.

Returning again to the three essential characteristics of thickening, stabilization and bleach odor reduction, stability includes both chemical stability within the composition and phase stability which is primarily achieved by selection of the hypochlorite and cross-linked polyacrylate polymer components as noted above. Phase stability is also affected by a stabilizer which is a further component discussed below. Generally, the characteristic of phase stability is dependent upon selection of the hypochlorite bleach component as noted above and the avoidance of salts such as chloride salts which have been found to interfere with stability.

Phase stability for the compositions of the present invention is of course dependent upon storage conditions. Generally, it has been found that the compositions of the present invention including the cross-linked polyacrylate polymers exhibit at least good stability over long term storage conditions including, for example, storage at 70° F. for periods of up to 300 days. As will be indicated in greater detail within the Experimental Section set forth below, stability for the compositions of the present invention is excellent at least with certain of the cross-linked polyacrylate polymers.

In addition to enhancing stability through the use of a stabilizer as discussed below, the ionic strength of the bleach composition is preferably controlled by proper selection of the hypochlorite bleach components and the stabilizing agent for achieving maximum stability. It has further been found that, with the ionic strength of the composition being very low, the cross-linked polyacrylate polymers tend to provide maximum thickening. However, ionic strength is necessary for achieving both phase stability and viscosity effects as noted above. In this regard, it has further been discovered that as thickening of the hypochlorite composition is maximized according to the present invention by the use of the cross-linked polyacrylate polymers and the selection of the hypochlorite composition, stability of the composition may actually decrease generally at the maximum levels of thickening. Accordingly, the composition of the present invention tends to exhibit an optimum combination of increased thickness and maximum phase stability of the composition which is typically somewhat less than the overall or maximum possible thickening effect for the hypochlorite solution alone.

As noted above, the characteristic of bleach odor reduction involves minimizing the release of oxidants to the atmosphere so that they produce the bleach odor characteristics referred to herein. These bleach odors may result from one or more oxidants or associated components of the hypochlorite composition depending for example upon surrounding conditions and characteristics of the surface upon which the composition is deposited.

Generally, hypochlorite compositions of the type contemplated by the present invention will invariably exhibit at least some level of bleach odor. Accordingly, in referring to a reduced bleach odor, it is contemplated by the present invention that the bleach odor be reduced or minimized but not entirely eliminated.

More specifically, the bleach components or more specifically the hypochlorite components of compositions of the type contemplated by the present invention are generally undesirable to users. Accordingly, the present invention particularly contemplates the use of cross-linked polyacrylate polymers for the purpose of reducing the apparent bleach odor from such compositions. As noted above, the compositions also preferably include a fragrance component which is typically more volatile than the bleach components producing the bleach odors. It is also theorized that the effectiveness of the cross-linked polyacrylate polymers in reducing bleach odors of such compositions are enhanced by the presence of such fragrance components within the composition. With such a combination, the fragrance component either serves to merely mask the reduced bleach odor for the composition of the present invention. Possibly because of the relative volatilities for the bleach components and the fragrance components, the cross-linked polyacrylate polymers may actually exhibit preferential reduction of bleach odors relative to the desirable fragrance.

The level of bleach odor available in the air is generally detected by tests carried out either by panels of observers or by instrumentation generally intended to correspond to the results achieved by such panels. In a characteristic test, the composition is applied to an internal surface of a box having approximately 1–2 cubic feet of volume. A lid is then closed on the box with a small opening in the box permitting the panel members to determine the effect of oxidants released from the composition. Similarly, various instruments are also available for detecting the level of oxidants such as chlorine gas ($Cl_2$) in the air. The use of such instruments has been found to correlate quite closely to panels of human observers.

In any event, the three characteristics of thickening or increased viscosity, stabilization and reduced bleach odor as discussed above are essential to the composition of the present invention. As noted above, the hypochlorite component and a cross-linked polyacrylate polymer are essential to formation of a hypochlorite composition exhibiting those three characteristics. Other components may also be necessary or desirable to achieve optimum characteristics of the composition.

Benefits of the cross-linked polyacrylate polymer in the thickened hypochlorite compositions of the present invention are believed to be particularly well demonstrated by the atomization data in Table I. Referring to Table I, Example 1 is a standard thickened hypochlorite composition according to the present invention without the cross-linked polyacrylate polymer of the present invention. Examples 2–7 represent compositions including equal amounts of cross-linked polyacrylate polymer and with varying amounts of a salt, sodium chloride, in order to vary the viscosity of Examples 2–7 from approximately 32 centipoise to approximately 1,060 centipoise.

The specific compositions for Examples 1–7 are set forth in greater detail within the following Experimental Section. However, Table I illustrates atomization data for these different compositions. The atomization data termed “Mist Residence Time” in Table I, was obtained by spraying the respective compositions onto a vertical hard surface and then observing an area adjacent the surface by video means to determine the amount of time, measured in seconds, during which particles of the composition remained in the air. Referring again to Table I, the prior art Example 1 had a residence time in the air adjacent the hard surface of approximately 6.5 seconds. By contrast, the residence time for Examples 2–7 varied from approximately 4.8 seconds down to about 4.2 seconds.

The substantial reduction in residence time for the compositions thickened with cross-linked polyacrylate polymer according to the present invention are believed to be representative of the substantially larger particle size produced by the composition and particularly by the cross-linked polyacrylate polymer. At the same time, the residence time indicated in Table I is also believed to be related to “bounce-back” as discussed above. In other words, as the compositions of the present invention were sprayed onto the hard surface, they recovered their increased viscosity prior to impacting the hard surface so that they tended to adhere better to the hard surface with reduced bounce-back.

Accordingly, both the characteristics of bounce-back and particle size are believed important in achieving the reduced residence time indicated in Table I. Of greater importance, the reduced residence times for the compositions of the present invention as illustrated in Table I are believed to correlate to reduced bleach odor achieved by the presence of the cross-linked polyacrylate polymer within the compositions. It is also particularly important to note that the reduced residence times for the compositions of the present invention were achieved with a broad range of viscosities extending from approximately 136 centipoise up to approximately 1,060 centipoise. In other words, the ability of the cross-linked polyacrylate polymer to produce larger particles and accordingly reduced bleach odor appears to be present over a broad viscosity range. It is believed that these consistent results achieved over a broad range of viscosities are due to the uniform yield point of the cross-linked polyacrylate polymer and it is again noted that all of Examples 2–7 included equal percentages of the same polymer.

The theory set forth above with relation to Table I is set forth for purposes of providing a better understanding of the invention. At the same time, the theoretical discussion set forth above is not intended to limit the scope of the invention. Rather, it is contended that the primary conclusion to be drawn from Table I is that the residence times for compositions of the present invention in the air adjacent a hard surface being sprayed with the composition are similar over a broad viscosity range. At the same time, the amount of bleach odor released by particles of thickened hypochlorite bleach is believed to be approximately proportional to the residence time of the particles in air. Thus, the reduced residence times for the compositions of the present invention including the cross-linked polyacrylate polymer are believed to demonstrate not only a relatively larger particle size and reduced bounce-back but also reduced bleach odor because of the reduced residence time in air.

It is also noted that the stability of all of the compositions thickened with the cross-linked polyacrylate polymer, including those in Table I, exhibited excellent stability at 70° F. for up to 300-day test durations. Some variation in stability of the thickened hypochlorite compositions was noted with different cross-linked polyacrylate polymers. However, all of the cross-linked polyacrylate polymers provided at least good stability in the thickened hypochlorite composition.

The Surfactant Component

As summarized above, surfactants may be added to the hypochlorite composition either for supplemental thickening (in addition to the cross-linked polyacrylate polymer) or for non-thickening purposes such as cleaning, improved phase stability, etc. Bleach stability in the presence of the hypochlorite component is a basic criteria for selecting a surfactant or surfactants to be included in the composition. Generally, a wide variety of surfactants may be stable in the presence of bleaches such as hypochlorite in an aqueous solution including but not limited to amine oxides, betaines, sarcosinates, taurates, alkyl sulfates, alkyl sulfonates, alkyl aryl sulfonates, alkyl phenol ether sulfates, alkyl diphenyl oxide sulfonates, alkyl phosphate esters, etc. Generally, such co-surfactants may be any of a variety of different types including anionics, nonionics, amphoterics, etc.

Amine oxides and alkyl ether sulfates may be preferred surfactants for the composition as indicated in certain of the examples set forth below. However, this statement is not intended to limit the scope of surfactants suitable for use in the hypochlorite compositions of the present invention. Accordingly, various classes of bleach stable surfactants are described in greater detail below.

Bleach-stable anionic surfactants useful in the present invention and which are especially stable in the presence of hypochlorite include two principal groups. One group comprises bleach-stable anionics surfactants, more specifically water-soluble alkyl sulfates and/or sulfonates, particularly those including from about 8 to 18 carbon atoms in the alkyl group. A second group of bleach-stable anionic surfactant materials suitable for the compositions of the present invention include water-soluble betaine surfactants having the general formula:

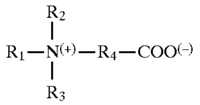

wherein $R_1$ is an alkyl group containing from about 8 to 18 carbon atoms; $R_2$ and $R_3$ are each lower alkyl groups containing from about 1 to 4 carbon atoms and $R_4$ is an alkaline group selected from the group consisting of methylene, propylene, butylene and pentylene.

Non-ionic surfactants suitable for use in the thickened hypochlorite compositions of the present invention include ethoxylated and/or propoxylated non-ionic surfactants such as those available from BASF Corporation under the trade names PLURONIC and TETRONIC. These products are only representative of non-ionic surfactants suitable for use in the present invention and are accordingly not intended to limit the invention in that regard.

Other bleach-stable surfactants include amine oxides, phosphine oxides and sulfoxides. However, these surfactants are generally high sudsing.

Additional bleach-stable surfactants suitable for use in the present invention include alkyl phosphonates and anionic surfactants including linear or branched alkali metal mono- and/or di-($C_{8-14}$) alkyl diphenyl oxide mono- and/or disulfonates, commercially available from Dow Chemical Co. under the trade names DOWFAX 3B-2 (sodium n-decyl diphenyloxide disulfonate) and DOWFAX 2A-1 (sodium-dodecyl diphenyloxide disulfonate).

As noted above, the specific identity of surfactants employed within the hypochlorite compositions of the present invention is not critical to the invention except for the requirements of bleach stability and compatibility with other components of the composition to perform either supplemental thickening in combination with the cross-linked polyacrylate polymers or non-thickening surfactant functions such as those noted above.

Other Adjuncts

Compositions formulated in accordance with the present invention may also include other components such as fragrances, coloring agents, fluorescent whitening agents (FWA), chelating agents and corrosion inhibitors (to enhance performance, stability and/or aesthetic appeal of the composition). All such adjuncts are also selected with the essential or at least preferable characteristic of being bleach or hypochlorite resistant. Since these components are not critical according to the present invention, except for the possible interaction of fragrance with bleach odor as discussed elsewhere herein, they are not discussed further.

The novel and unexpected benefits of the cross-linked polyacrylate polymers in achieving the three essential characteristics of thickening, stabilization and bleach odor reduction have been found to differ substantially from other thickeners employed in such compositions. It is of course well known to employ a variety of materials for general purposes of thickening. For example, typical thickeners include inorganic thickeners which are usually colloidal and may include clay, alumina or alumina with surfactants, organic thickeners which are usually surfactants and may be combined with solvents or electrolytes or may be in the form of broad-shaped micelles, or other polymer thickeners such as xanthan gum, cellulose or even normal types of polyacrylates as discussed above. It has been found according to the present invention that such thickeners are unsatisfactory in a hypochlorite composition as contemplated herein. More specifically, inorganic thickeners are generally undesirable particularly in spray-type dispensers since the thickeners would interfere with sheet characteristics developed in the dispensers. More broadly, both the inorganic and organic thickeners as characterized above are unsatisfactory because they are unstable, unlike the cross-linked polyacrylate polymers preferred by the invention.

Referring particularly to polymer thickeners, there is also a problem of stability with natural thickeners such as xanthan gum and cellulose since the hypochlorite component would tend to attack the thickener before it accomplishes its purpose of thickening when the composition is directed upon a surface to be cleaned As noted above, the cross-linked polyacrylate polymers are effective across a broad range of increased viscosities ranging for example from 20 up to 5,000 centipoise and even greater for simultaneously achieving desired thickening as well as stabilization of the composition and a reduction of bleach odor. These essential characteristics are realized where the composition is employed in a wide variety of dispensers for directing the composition as a spray, stream or otherwise onto hard surfaces to be cleaned. More specifically, as also noted above, the invention particularly contemplates the use of the compositions in spray-type dispensers such as manually operated trigger-type dispensers. In these dispensers, the composition is divided into relatively fine particles which are then directed as a spray onto the surface to be cleaned. The spray dispenser is particularly desirable in its ability to uniformly apply the composition to a relatively large area of the surface.

As also noted above, the use of the composition of the present invention in such spray-type dispensers requires shear sensitivity or shear thinning of the composition as it passes through the dispenser. In addition, it is important that the composition immediately recover its thickened character in order to properly adhere to the surface to be cleaned. This characteristic is generally referred to as rapid viscosity recovery.

The ability of the cross-linked polyacrylate polymers to achieve rapid viscosity recovery is believed due to their plastic character which is also characterized by the presence of a yield value. As was also noted above, the yield value of the cross-linked polyacrylate polymers is also believed to contribute to their ability to reduce bleach odor.

The Stabilizer Component

As noted above, a stabilizer is preferably employed for achieving optimum stability of the aqueous solution of the hypochlorite and the cross-linked polyacrylate polymer. As note above, the stabilizer is preferably either potassium hydroxide or sodium hydroxide. In this regard, the identity and function of such stabilizers are well known for cross-linked polyacrylate polymers such as those available from the manufacturers listed above.

The Fragrance Component

The invention also preferably contemplates the inclusion of a bleach stable fragrance either for enhancing or possible masking the reduced bleach odor of the composition. It is theorized that the preferred cross-linked polyacrylate polymer not only serves to minimize the bleach odor of the hypochlorite composition but also to enhance the aroma or odor of a fragrance included in the composition. Possibly, this effect is due to the relative volatility of the fragrance being substantially greater than oxidants in hypochlorite components which cause the bleach odors.

Accordingly, any of a variety of well known fragrances may be employed in the composition of the present invention as long as they do not interfere with the three essential characteristics of increased thickening or viscosity, stabilization and reduced bleach odor. At the same time, it is generally contemplated that the fragrance component either enhance or mask the reduced bleach odor as noted above.

The compositions of the present invention as described above and illustrated by the examples in the following Experimental Section are generally characterized by a specific gravity of less than about 1.1.

The unique characteristics of the present invention and the components of the hypochlorite composition of the invention are discussed in greater detail below in connection with preferred embodiments or examples set forth in the following Experimental Section.

Experimental Section

The initial examples discussed immediately below included the basic combination of a hypochlorite component, a cross-linked polyacrylate polymer and a stabilizer for stabilizing the polymer in the hypochlorite, the balance being essentially water. These compositions were also characterized by the preferred yield value in the range of about 0.4 to 20 dynes per $cm^2$.

Initially, Example 1 was a conventional hypochlorite bleach composition containing no cross-linked polyacrylate polymer. Except for the hypochlorite bleach, Example 1 contained generally the same components as Examples 2–7. All of Examples 2–7 used a high strength bleach substantially free of sodium chloride.

Example 2–7 each included 0.80 weight percent of a cross-linked polyacrylate polymer, namely CARBOPOL 613 from B. F. Goodrich Co. Examples 2–7 also included varying amounts of sodium chloride as a viscosity modifier resulting in different viscosities and yield values as indicated in Table I.

With these variations in yield value and viscosity, the compositions of Examples 2–7 were characterized by good stability and good reduced bleach odor in addition to exhibiting the increased viscosities represented in Table I.

All of Examples 2–7 exhibited substantially reduced residence times or bounce-back as described herein. It is noted again that the desirable characteristics for the compositions of the present invention were achieved over a broad range of viscosities demonstrated in Table I.

The residence times are set forth for each of Examples 1–7 near the bottom of Table I.

The ability of the compositions of the invention to reduce the Mist Residence Time (MRT) is demonstrated in the last horizontal column of Table I under the heading "Dissipation Rate Increase". These values were obtained by dividing the MRT for the control (Example 1) by the MRT for each of Examples 2–7 and multiplying by 100. This reduction of the MRT by the compositions of the invention thus provide a percentage indication of their ability to increase the dissipation rate (of the mist). The Dissipation Rate Increase values therefor provide a further indication of the effectiveness of the inventive compositions to exhibit reduced bleach odor upon application to a surface to be cleaned.

TABLE I

EFFECTS OF VARYING VISCOSITY AND YIELD VALUE

| Examples<br>Material | 1<br>Control<br>Wt % | 2<br>Wt % | 3<br>Wt % | 4<br>Wt % | 5<br>Wt % | 6<br>Wt % | 7<br>Wt % |
|---|---|---|---|---|---|---|---|
| CARBOPOL 613 | 0.00 | 0.80 | 0.80 | 0.80 | 0.80 | 0.80 | 0.80 |
| NaOH | 0.60 | 1.00 | 1.00 | 1.00 | 1.00 | 1.00 | 1.0 |
| Bleach (NaOCl) | 2.50 | 2.50 | 2.50 | 2.50 | 2.50 | 2.50 | 2.50 |
| Amine Oxide | 0.50 | 0.50 | 0.50 | 0.50 | 0.50 | 0.50 | 0.50 |
| NaCl | 0.00 | 0.00 | 0.50 | 1.00 | 2.00 | 3.00 | 5.00 |
| Water | Bal. | Bal. | Bal. | Bal. | Bal. | Bal. | Bal. |
| Brookfield Yield Value[1] (dynes/$cm^2$) | None | 18.6 | 10.0 | 6.4 | 1.2 | 0.4 | 0.8 |
| Brookfield Viscosity (cps) | 1 | 1060 | 672 | 440 | 256 | 232 | 136 |
| Mist Residence Time (seconds) | 6.90 | 4.16 | 424 | 4.21 | 4.20 | 4.63 | 4.74 |
| Percent Dissipation Rate Increase | — | 65.8 | 64.2 | 63.8 | 62.7 | 49.0 | 45.6 |

1. The Brookfield Yield Value was determined as follows:
Measurements were made using a Brookfield RVT viscometer equipped with the #2 spindle run at 0.50 rpm and 1.0 rpm. Readings were made after 30 seconds or when stable.
$(V_a-V_b)/100$ = Brookfield Yield Value
where:
$V_a$ = viscosity @ slowest available viscometer speed.
$V_b$ = viscosity @ next-to-slowest viscometer speed.
2. The Brookfield Viscosity was determined using the Brookfield RVT viscometer described above equipped with the #2 spindie run at 5 rpm.
3. Mist Residence Time (MRT) was determined by using a high speed video camera and describes the amount of time mist is suspended in air. The MRT correlates with both Vapor Phase Oxidant and panelist data.

Table II set forth below includes data for additional Examples 8–14 which were intended to illustrate the effects of different levels of the cross-linked polyacrylate polymer in the compositions of the invention. Note that Example 8 also was a control and did not include a cross-linked polyacrylate polymer component.

Otherwise, Examples 9 and 10 included a relatively high level of polymer, about 0.8 percent by weight. Examples 9, 11 and 13 included sodium hydroxide as a stabilizer while Examples 10, 12 and 14 included potassium hydroxide as a stabilizer.

Examples 11 and 12 included 0.6 percent by weight of the cross-linked polyacrylate polymer while Examples 13 and 14 included 0.4 percent by weight of the polymer.

All of Examples 8–14 included high strength bleach substantially free from sodium chloride salt.

All of the examples included 0.5 percent by weight of an amine oxide surfactant, 0.08 percent by weight of a fragrance with the balance being water. The viscosities of Examples 9–14 varied from approximately 2,480 centipoise for Example 10 down to approximately 32 centipoise for Example 13 with the control Example 8 exhibiting 1 cps viscosity because of the absence of a cross-linked polyacrylate polymer. The pH for all of Examples 8–14 was in the range of 12–13.

The compositions with cross-linked polyacrylate polymer exhibited excellent hypochlorite stability.

bleach compatible trigger sprayers. The nozzle of each trigger sprayer is adjusted to full open. The sprayers are primed by dispensing the product into a sink with three or four squeezes of the trigger. Once evaluators have been collected, either a Control or a Test Product is sprayed within five seconds onto the back wall with five squeezes of the trigger. Evaluators by two's immediately sniff the box and grade the bleach odor/irritation intensity on a four step ranking of Low (no bleach odor), Medium, High and Very High bleach odor. Evaluation is completed within 30 seconds. The Control samples are comparative bleach compositions (no polymer).

Table III includes Examples 15–23 which illustrated the effects of various cross-linked polyacrylate polymers in the compositions of the invention.

As indicated in Table III, Examples 15–23 included different grades of cross-linked polyacrylate polymers available either under the trade name CARBOPOL from B. F. Goodrich Co. or the trade name POLYGEL from 3V Chemical Co. All of the polymers included in Table III for Examples 15–23 were cross linked in accordance with the present invention.

Here again, as indicated in Table III Examples 15–23 included either sodium hydroxide or potassium hydroxide as

TABLE II

EFFECT OF DIFFERENT LEVELS OF POLYMER

| Example<br>Material | 8<br>Control<br>Wt % | 9<br>Wt % | 10<br>Wt % | 11<br>Wt % | 12<br>Wt % | 13<br>Wt % | 14<br>Wt % |
|---|---|---|---|---|---|---|---|
| Carbopol 613 | 0.00 | 0.80 | 0.80 | 0.60 | 0.60 | 0.40 | 0.40 |
| NaOH | 0.60 | 1.00 | — | 0.89 | — | 0.78 | — |
| KOH | — | — | 1.40 | — | 1.25 | — | 1.08 |
| Bleach (High Strength NaOCl) | 2.50 | 2.50 | 2.50 | 2.50 | 2.50 | 2.50 | 2.50 |
| Amine Oxide | 0.50 | 0.50 | 0.50 | 0.50 | 0.50 | 0.50 | 0.50 |
| Fragrance | 0.08 | 0.08 | 0.08 | 0.08 | 0.08 | 0.08 | 0.08 |
| Water | Bal. | Bal. | Bal. | Bal. | Bal. | Bal. | Bal. |
| Viscosity (cps) | 1 | 1380 | 2480 | 272 | 472 | 32 | 40 |
| Bleach Odor/ Irritation as perceived by panelists | High | Low | Low | Low | Low | Med | Med |

Bleach Odor Evaluation Method

Two PVC boxes consisting of side, bottom and top panels are assembled. Final internal dimensions of each box are 16"deep×24"high×23.5"wide. Test samples are poured into high density polyethylene bottles which are equipped with a stabilizer, a high strength bleach, an amine oxide surfactant, a fragrance and water as indicated.

All of Examples 15–23 included in Table III exhibited good characteristics of increased viscosity, phase stability and reduced bleach odor.

TABLE III

EFFECT OF VARIOUS POLYMERS

| Example<br>Material | 15<br>Wt % | 16<br>Wt % | 17<br>Wt % | 18<br>Wt % | 19<br>Wt % | 20<br>Wt % | 21<br>Wt % | 22<br>Wt % | 23<br>Wt % |
|---|---|---|---|---|---|---|---|---|---|
| Carbopol 623 | 0.80 | — | — | — | — | — | — | — | — |
| Carbopol 1382 | — | 0.80 | — | — | — | — | — | — | — |
| Carbopol 615 | — | — | 0.80 | 0.80 | — | — | — | — | — |
| Carbopol 617 | — | — | — | — | 0.80 | 0.80 | — | — | — |
| Polygel DA | — | — | — | — | — | — | 0.80 | — | — |
| Polygel DB | — | — | — | — | — | — | — | 0.80 | — |
| Polygel DK | — | — | — | — | — | — | — | — | 0.80 |
| NaOH | 1.00 | 1.00 | 1.00 | — | 1.00 | — | 1.00 | 1.00 | 1.00 |
| KOH | — | — | — | 1.40 | — | 1.40 | — | — | — |

TABLE III-continued

EFFECT OF VARIOUS POLYMERS

| Example Material | 15 Wt % | 16 Wt % | 17 Wt % | 18 Wt % | 19 Wt % | 20 Wt % | 21 Wt % | 22 Wt % | 23 Wt % |
|---|---|---|---|---|---|---|---|---|---|
| Bleach (NaOCl) | 2.50 | 2.50 | 2.50 | 2.50 | 2.50 | 2.50 | 2.50 | 2.50 | 2.50 |
| Amine Oxide | 0.50 | 0.50 | 0.50 | 0.50 | 0.50 | 0.50 | 0.50 | 0.50 | 0.50 |
| Fragrance | 0.08 | 0.08 | 0.08 | 0.08 | 0.08 | 0.08 | 0.08 | 0.08 | 0.08 |
| Water | Bal. | Bal. | Bal. | Bal. | Bal. | Bal. | Bal. | Bal. | Bal. |
| Viscosity (CPS) | 96 | 136 | 208 | 736 | 24 | 56 | 40 | 124 | 72 |

There have accordingly been described above a number of embodiments and illustrative examples of formulations of liquid cleaning and/or hypochlorite bleach compositions according to the present invention. Additional variations and modifications of those embodiments and examples in accordance with the invention will be apparent in addition to those specifically set forth above. Accordingly, it is to be understood that the above disclosure of the invention is not limiting but is set forth in order to facilitate an understanding of the invention. The scope of the invention including modifications and additions as noted above is further defined by the following appended claims which are further exemplary of the invention.

What is claimed is:

1. A method of employing a thickened liquid bleach composition on a hard surface to be cleaned, the steps comprising:

forming the thickened liquid bleach composition to comprises:

an aqueous solution of a hypochlorite of an alkali metal, the hypochlorite forming from about 0.1 to about 10% by weight of the composition, at least one cross-linked polyacrylate polymer in an amount of about 0.2 to 2.0% by weight of the composition for thickening the composition to a viscosity of at least about 20 centipoise (cps) at 25° C., for effectively reducing bleach odor when the composition is dispensed onto a surface to be cleaned, and still further for maintaining stability of the composition and providing a compositional yield value in the range of from bout 0.1 to about 100 dynes per $cm^2$, and a stabilizer in an amount effective for providing a composition pH above 12 for stabilizing the cross-linked polyacrylate in the presence of the hypochlorite wherein the composition is a solution that is free of suspended solids for use with a spray dispenser, has an ionic strength of less than about 0.75 g-ions/Kg, and contains essentially no chloride salt; and directing the thickened liquid bleach composition in the form of a spray onto the surface to be cleaned, wherein said spray is a gas suspended liquid particle having a diameter greater than about 10 millimicrons.

2. The method of claim 1 further comprising a hypochlorite bleach stable fragrance, the reduction of bleach odor achieved in the composition by the cross-linked polyacrylate polymer enhancing the odor of the fragrance.

3. The method of claim 1 wherein the stabilizer is selected from the group consisting of sodium hydroxide and potassium hydroxide.

4. The thickened liquid bleach composition of claim 1 having a maximum viscosity of less than about 5,000 centipoise (cps) at 25° C. hypochlorite is potassium hypochlorite.

5. The method of claim 1 having a viscosity in the range of about 50–300 cps or achieving optimum atomization in the spray-type dispenser.

6. A thickened liquid bleach composition comprising:

an aqueous solution of a hypochlorite of an alkali metal being substantially free of alkali metal chloride salts, the hypochlorite forming from about 0.1 to about 10% by weight of the composition;

at least one cross-linked polyacrylate polymer in an amount of about 0.2 to 2.0% by weight of the composition for thickening the composition to a viscosity of at least about 20 centipoise (cps) at 25° C., for effectively reducing bleach odor when the composition is dispensed onto a surface to be cleaned and still further for maintaining stability of the composition and for providing a compositional yield value in the range of from about 0.1 to about 100 dynes per $cm^2$; and a stabilizer in an amount effective for providing a composition pH above 12 for stabilizing the cross-linked polyacrylate in the presence of the hypochlorite;

wherein the composition is a solution that is free of suspended solids, has an ionic strength of less than about 0.75 g-ions/Kg, contains essentially no chloride salt, and is capable of being dispensed in the form of a spray, wherein said spray is a gas suspended liquid particle having a diameter greater than about 10 millimicrons.

7. The thickened liquid bleach composition of claim 6 wherein the hypochlorite forms from about 1.0 to about 6% by weight of the composition.

8. The thickened liquid bleach composition of claim 6 further comprising a hypochlorite bleach stable fragrance, the reduction of bleach odor achieved in the composition by the cross-linked polyacrylate polymer enhancing the odor of the fragrance.

9. The thickened liquid bleach composition of claim 6 having a maximum viscosity of less than about 5,000 centipoise (cps) at 25° C.

10. The thickened liquid bleach composition of claim 6 having a specific gravity of less than 1.1.

11. The thickened liquid bleach composition of claim 6 wherein the composition has a yield value in the range of from about 0.4 about 50 dynes per $cm^2$.

12. The thickened liquid bleach composition of claim 6 wherein the cross-linked polyacrylate polymer has a yield value in the range of from about 0.4 to about 25 dynes per $cm^2$.

13. The thickened liquid bleach composition of claim 6, wherein the stabilizer is sodium hydroxide or potassium hydroxide.

14. The thickened liquid bleach composition of claim 6 wherein the hypochlorite is selected from the class consisting of sodium hypochlorite and potassium hypochlorite.

15. The thickened liquid bleach composition of claim 14 wherein the hypochlorite is potassium hypochlorite.

16. The thickened liquid bleach composition of claim 6 having a maximum viscosity of about 1,000 cps.

17. The thickened liquid bleach composition of claim 16 having a viscosity in the range of about 50–300 cps for achieving optimum atomization in the spray-type dispenser.

18. The thickened liquid bleach composition of claim 17 further comprising a hypochorite bleach stable fragrance, the reduced bleach odor achieved in the composition by the cross-linked polyacrylate enhancing the odor of the fragrance.

19. In an aqueous bleaching composition and spray dispenser combination of the type which comprises a hypochlorite active and a trigger spray dispenser, the improvement which comprises:

the hypochlorite being present in an amount of about 1 to about 10% by weight and being substantially free from alkali metal chloride salts;

at least one cross-linked polyacrylate polymer being present in an amount effective for thickening the composition to a viscosity of between about 20 and 1,000 centipoise (cps) at 25° C., for effectively reducing bleach odor when the composition is dispensed onto a surface to be cleaned, and still further for maintaining stability of the composition, the cross-linked polyacrylate polymer providing a compositional yield value in the range of from about 0.1 to about 100 dynes per $cm^2$; and a stabilizer being present in an amount effective to provide a composition pH above 12 for stabilizing the cross-linked polyacrylate in the presence of the hypochlorite;

wherein the composition is a solution that is free of suspended solids for use in the form of a spray, has an ionic strength of less than about 0.75 g-ions/Kg, and contains essentially no chloride salt, further wherein said spray is a gas suspended liquid particle having a diameter greater than about 10 millimicrons.

20. A method of making a thickened liquid bleach composition for use in a spray dispenser to direct the composition onto a hard surface to be cleaned, the spray dispenser tending to divide the composition into liquid particles and resulting in the reduction of bleach odor, the method comprising the steps of:

forming an aqueous solution of hypochlorite of an alkali metal being substantially free of alkali metal chloride salts, the hypochlorite of an alkali metal being substantially free of alkali metal chloride salts, the hypochlorite comprising from about 0.1 to about 10% by weight of the composition; and adding at least one cross-linked polacrylate polymer in an amount of about 0.2 to 2.0% by weight of the composition for thickening the composition to a viscosity of at least about 20 centipoise (cps) at 25° C., for effectively reducing bleach odor when the composition is dispensed onto a surface to be cleaned, and still further for maintaining stability of the composition and providing a compositional yield value in the range of from about 0.1 to about 100 dynes per $cm^2$, and a stabilizer in an amount effective for providing a composition pH above 12 for stabilizing the cross-linked polyacrylate in the presence of the hypochlorite;

wherein the composition is a solution that is free of suspended solids for use with the spray dispenser, has an ionic strength of less than about 0.75 g-ions/Kg, and contains essentially no chloride salt.

21. The method of claim 20 further comprising a hypochlorite bleach stable fragrance, the reduction of bleach odor achieved in the composition by the cross-linked polyacrylate polymer enhancing the odor of the fragrance.

22. The thickened liquid bleach composition of claim 20 having a maximum viscosity of less than about 5,000 centipoise (cps) at 25° C.

23. The method of claim 20 having a specific gravity of less than 1.1.

* * * * *